(12) United States Patent  (10) Patent No.: US 7,939,814 B2
Imai  (45) Date of Patent: May 10, 2011

(54) RADIOGRAPHIC IMAGE DETECTOR

(75) Inventor: Shinji Imai, Ashigarakami-gun (JP)

(73) Assignee: FUJIFLIM Corporation, Tokyo (JP)

(*) Notice: Subject to any disclaimer, the term of this patent is extended or adjusted under 35 U.S.C. 154(b) by 0 days.

(21) Appl. No.: 12/341,228

(22) Filed: Dec. 22, 2008

(65) Prior Publication Data

US 2009/0159806 A1  Jun. 25, 2009

(30) Foreign Application Priority Data

Dec. 25, 2007 (JP) ................. 2007-331495

(51) Int. Cl.
*G21K 4/00* (2006.01)
*G03C 5/16* (2006.01)
*A61B 6/00* (2006.01)

(52) U.S. Cl. ......... 250/582; 250/591; 250/584; 250/581

(58) Field of Classification Search .......... 250/580–589, 250/590, 591
See application file for complete search history.

(56) References Cited

U.S. PATENT DOCUMENTS 5,012,107 A * 4/1991 Kano et al. ................ 250/484.4
6,642,534 B2   11/2003 Shima et al.
2003/0102424 A1 * 6/2003 Izumi et al. ............... 250/208.1
2004/0104362 A1 * 6/2004 Imai .......................... 250/582
2004/0165102 A1 * 8/2004 Komatsu et al. ............ 348/370

FOREIGN PATENT DOCUMENTS

JP   09-036341 A   2/1997
JP   2001-177140 A   6/2001

* cited by examiner

*Primary Examiner* — David P Porta
*Assistant Examiner* — Jessica L Eley
(74) *Attorney, Agent, or Firm* — Sughrue Mion, PLLC

(57) ABSTRACT

A radiographic image detector includes: a bias electrode transmitting a recording electromagnetic wave carrying image information; a recording photoconductive layer consisting primarily of a-Se, the recording photoconductive layer generating electric charges when exposed to the recording electromagnetic wave transmitted through the bias electrode; and a number of charge detecting elements two-dimensionally arrayed in directions perpendicular to each other, each charge detecting element comprising a charge storage section for storing the electric charge generated at the recording photoconductive layer and a switching element for reading out an electric charge signal of the electric charge stored in the charge storage section. The radiographic image detector further includes a thin fluoride layer provided between the bias electrode and the recording photoconductive layer.

8 Claims, 3 Drawing Sheets

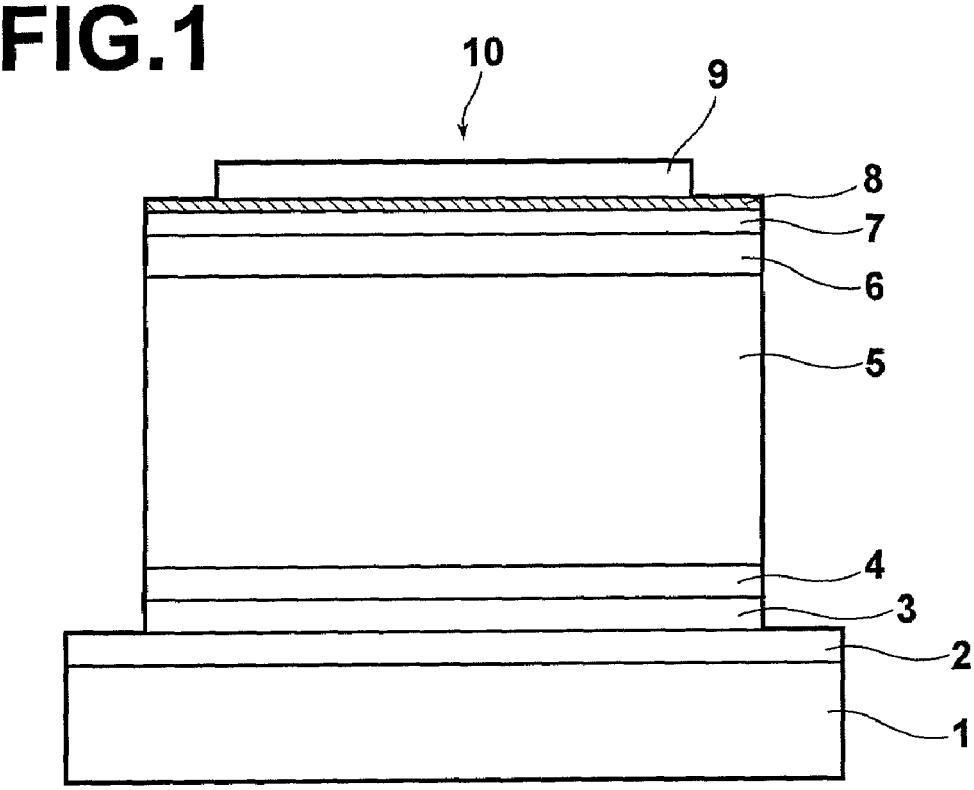
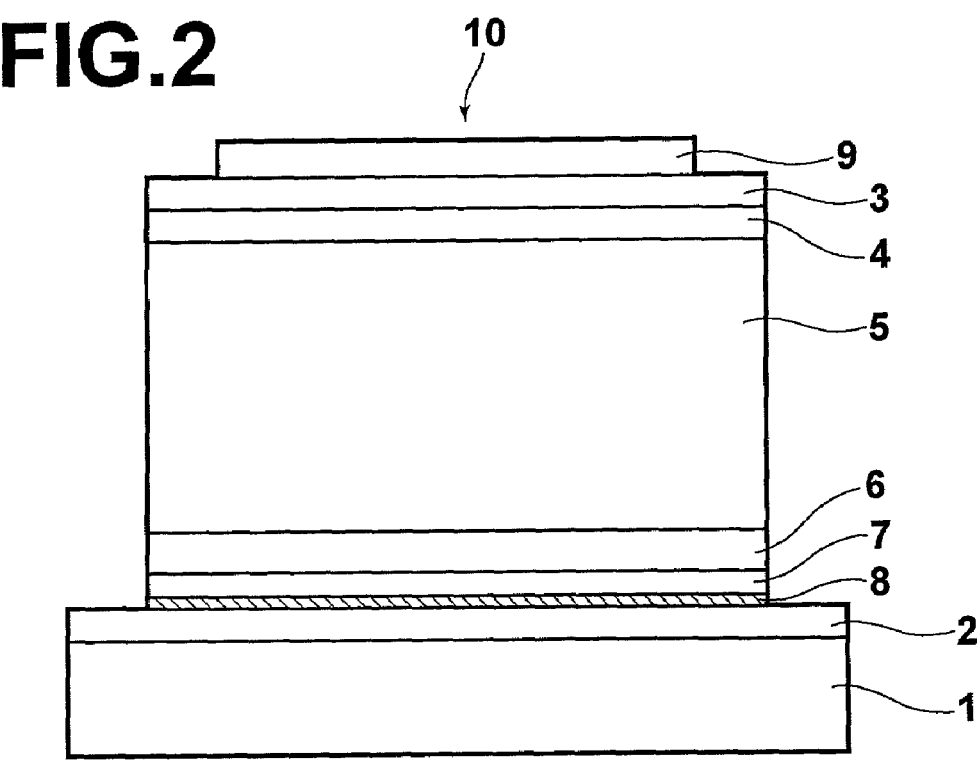

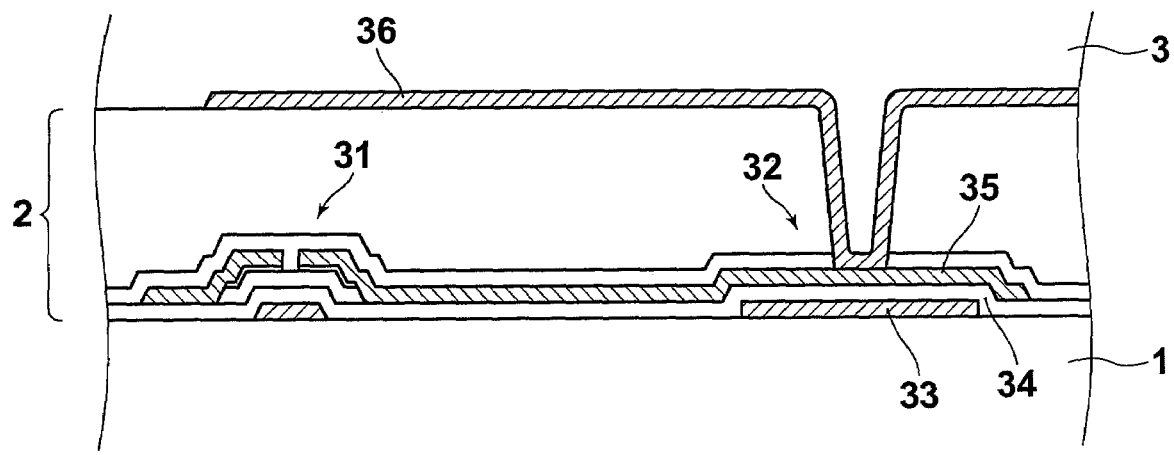
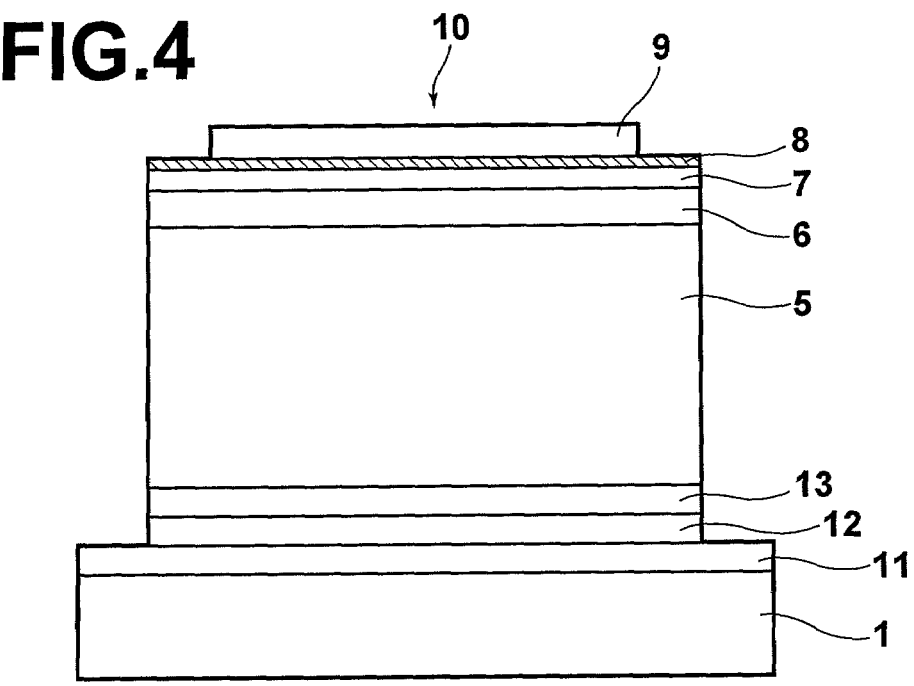

RADIOGRAPHIC IMAGE DETECTOR

BACKGROUND OF THE INVENTION

1. Field of the Invention

The present invention relates to a radiographic image detector which is suitably applicable to a radiographic imaging apparatus such as an X-ray imaging apparatus.

2. Description of the Related Art

In the field of radiographic imaging for medical diagnosis, radiographic imaging apparatuses employing a radiographic image detector (its main part is formed by semiconductor) that detects and converts the radiation into an electric signal are known. The radiographic image detectors include those of direct conversion type that directly convert the radiation into electric charges and store the electric charges, and those of indirect conversion type that once convert the radiation into light using a scintillator, such as a CsI:Tl or GOS ($Gd_2O_2S$:Tb) scintillator, and then convert the light into electric charges at a photoconductive layer and store the electric charges. Further, from the aspect of a reading technique used, the radiographic image detectors are roughly classified into: those (hereinafter may be referred to as TFT-type) in which electric charges generated due to the applied radiation are stored in storage capacitors, and the stored electric charges are read by turning electric switches, such as thin film transistors (TFTs), on or off pixel by pixel; and those of so-called optical reading type, in which electric charges generated due to the applied radiation are stored in charge storage sections, and the stored electric charges are read using a semiconductor material that generate an electric charge when exposed to light.

In the direct conversion-type radiographic image detector, a predetermined bias voltage is applied between a bias electrode formed on the front surface of a semiconductor film (recording photoconductive layer), which is sensitive to radiation, and a reference electrode formed on a substrate, and electric charges generated due to the applied radiation are collected by charge collection electrodes formed on the back surface of the semiconductor film to take out the charges as radiation detection signals to detect the radiation. The recording photoconductive layer is often formed of amorphous selenium (a-Se) because of advantages such as high dark resistance and excellent response speed.

In general, as the electrode material, a metal material, such as Au, Pt or Pd, having a large work function (around 5 eV) is often used, in view of environmental stability. The work function of a-Se is about 5.8 eV, and therefore a difference in work function is small between a-Se and the electrode material. Therefore, when the electrode is formed on the a-Se and the bias voltage, which provides a positive potential, is applied, a dark current is generated due to holes injected from the electrode to the a-Se with the aid of an electric field. Once injected, the excessive holes contribute to a large dark current that significantly exceeds a high specific resistance of the a-Se.

For example, U.S. Pat. No. 6,642,534 and Japanese Unexamined Patent Publication No. 2001-177140 teach that forming a $Sb_2S_3$ layer (having a thickness of 0.01-50 µm) on an a-Se layer, holes can be blocked relying on the interface between the Se layer and the $Sb_2S_3$ layer. Further, Japanese Unexamined Patent Publication No. H9-036341 teaches that an a-Se layer doped with LiF is provided as a hole trapping layer (having a thickness of 0.5-10 µm) to trap all electric charges injected from a positive electrode and reduce the intensity of electric field at the interface of the positive electrode.

Although the hole blocking layer disclosed in U.S. Pat. No. 6,642,534 or Japanese Unexamined Patent Publication 2001-177140 can satisfy initial electrical characteristics (with respect to dark current), it is difficult to maintain the electrical characteristics (with respect to dark current and defect) over a long period of time. The reason is believed to be that, since the blocking of the holes relies on the interface between the Se layer and the $Sb_2S_3$ layer, a slight change in properties of the interface where the Se layer and the $Sb_2S_3$ layer are joined likely to alter the hole blocking property. Therefore, after repeated use, the dark current characteristics temporarily deteriorate, and this is problematic.

On the other hand, when a compound dopant, such as $CaF_2$, LiF or $LiF_2$, is doped to the a-Se layer, as in the hole trapping layer disclosed in Japanese Unexamined Patent Publication No. H9-036341, the a-Se tends to crystallize and it is difficult to maintain the quality (with respect to defect) over a long period of time. Further, in order to provide the hole trapping layer of a-Se doped with the compound dopant, it is necessary to dispose a Se boat and a boat for the dopant in the same vacuum chamber. Therefore, the Se boat tends to be contaminated by the vapor deposited dopant. This necessitates a shorter period of maintenance work, leading to increase in production costs.

SUMMARY OF THE INVENTION

In view of the above-described circumstances, the present invention is directed to providing a radiographic image detector, which can maintain electrical characteristics (with respect to dark current) after repeated use and electrical characteristics (with respect to dark current and defect) over a long period of time, thereby minimizing increase in production costs.

A first aspect of the radiographic image detector of the invention includes: a bias electrode transmitting a recording electromagnetic wave carrying image information; a recording photoconductive layer consisting primarily of a-Se, the recording photoconductive layer generating electric charges when exposed to the recording electromagnetic wave transmitted through the bias electrode; and a number of charge detecting elements two-dimensionally arrayed in directions perpendicular to each other, each charge detecting element including a charge storage section for storing the electric charge generated at the recording photoconductive layer and a switching element for reading out an electric charge signal of the electric charge stored in the charge storage section, wherein the radiographic image detector further includes a thin fluoride layer provided between the bias electrode and the recording photoconductive layer.

A second aspect of the radiographic image detector of the invention includes: a bias electrode transmitting a recording electromagnetic wave carrying image information; a recording photoconductive layer consisting primarily of a-Se, the recording photoconductive layer generating electric charges when exposed to the recording electromagnetic wave transmitted through the bias electrode; and a number of charge detecting elements two-dimensionally arrayed in directions perpendicular to each other, each charge detecting element including a charge storage section for storing the electric charge generated at the recording photoconductive layer and a switching element for reading out an electric charge signal of the electric charge stored in the charge storage section, wherein the radiographic image detector further includes a thin fluoride layer provided between the electric charge detecting elements and the recording photoconductive layer.

A third aspect of the radiographic image detector of the invention includes, in the following order: a first electrode transmitting a recording radiation ray; a recording photoconductive layer consisting primarily of a-Se, the recording photoconductive layer exhibiting photoconductivity when exposed to the recording radiation ray; a charge storage section for storing electric charges generated at the first electrode, the electric charges having a polarity of a latent image; a reading photoconductive layer exhibiting photoconductivity when exposed to a reading electromagnetic wave; and a second electrode transmitting the reading electromagnetic wave, wherein the radiographic image detector further includes a thin fluoride layer provided between the first electrode and the recording photoconductive layer.

A fourth aspect of the radiographic image detector of the invention includes, in the following order: a first electrode transmitting a recording radiation ray; a recording photoconductive layer consisting primarily of a-Se, the recording photoconductive layer exhibiting photoconductivity when exposed to the recording radiation ray; a charge storage section for storing electric charges generated at the first electrode, the electric charges having a polarity of a latent image; a reading photoconductive layer exhibiting photoconductivity when exposed to a reading electromagnetic wave; and a second electrode transmitting the reading electromagnetic wave, wherein the radiographic image detector further includes a thin fluoride layer provided between the second electrode and the reading photoconductive layer.

The thin fluoride layer in the first to fourth aspects of the radiographic image detector may have a layer thickness ranging from 1 to 5 nm.

BRIEF DESCRIPTION OF THE DRAWINGS

FIG. 1 is a schematic sectional view illustrating one embodiment of a radiographic image detector according to a first aspect of the invention, FIG. 2 is a schematic sectional view illustrating one embodiment of the radiographic image detector according to a second aspect of the invention, FIG. 3 is an enlarged sectional view of an active matrix layer, FIG. 4 is a schematic sectional view illustrating one embodiment of the radiographic image detector according to a third aspect of the invention.

DESCRIPTION OF THE PREFERRED EMBODIMENTS

Figure 5:
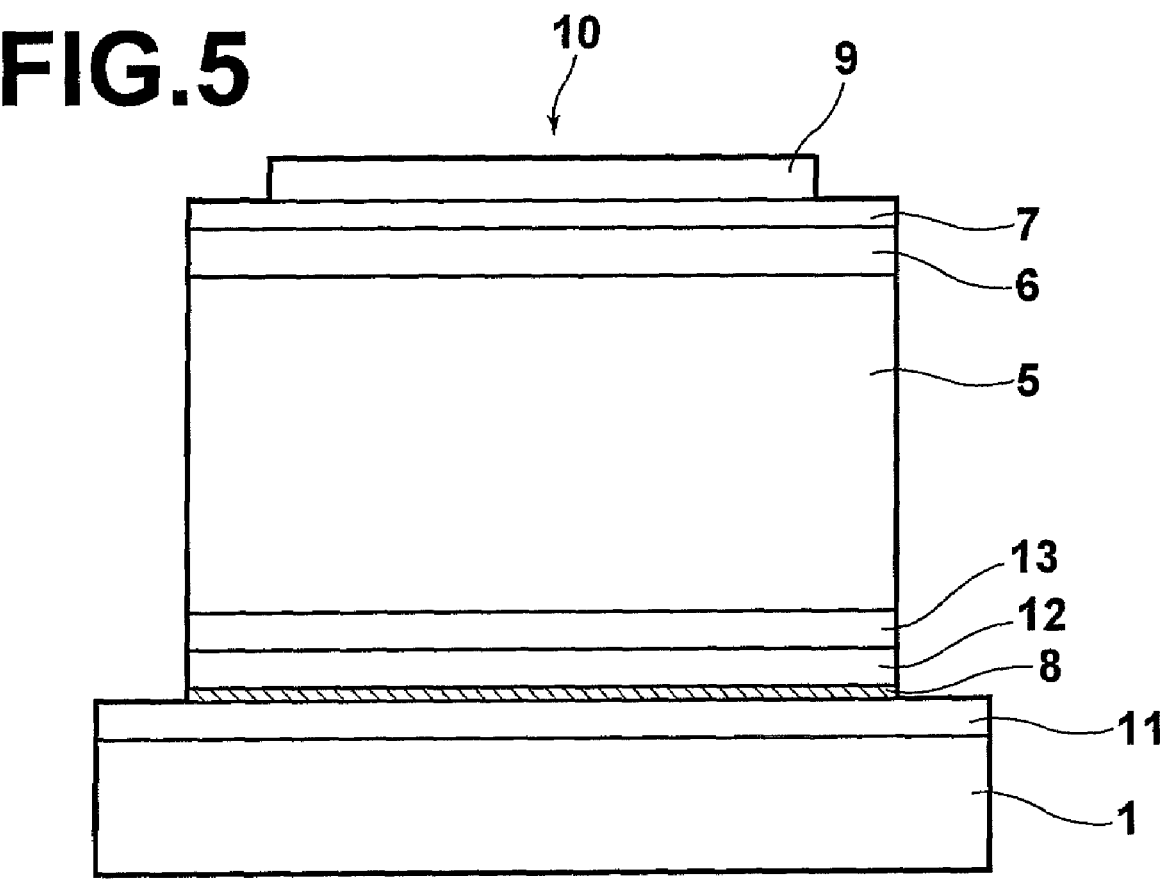
FIG. 5 is a schematic sectional view illustrating one embodiment of the radiographic image detector according to a fourth aspect of the invention.

Radiographic image detectors include those of direct conversion type that directly convert the radiation into electric charges and store the electric charges, and those of indirect conversion type that once convert the radiation into light using a scintillator, such as a CsI:Tl or GOS ($Gd_2O_2S$:Tb) scintillator, and then convert the light into electric charges at a photoconductive layer, such as an a-Se layer, and store the electric charges. The radiographic image detector of the present invention is applicable both to the direct conversion-type and indirect conversion-type radiographic image detectors. The radiation is not limited to X-ray, and other types of radiation, such as γ-ray or α-ray, may be used.

Further, the radiographic image detector of the invention is applicable both to the TFT-type and so-called optical reading-type radiographic image detectors.

Hereinafter, the radiographic image detector of the invention will be described with reference to the drawings. FIG. 1 is a schematic sectional view illustrating one embodiment of the radiographic image detector according to a first aspect of the invention. A radiographic image detector 10 shown in FIG. 1 includes: an active matrix layer 2 including reading circuits formed by TFTs, pixel electrodes and storage capacitors; an electron blocking layer 3; an anti-crystallization layer 4; a recording photoconductive layer 5; an anti-crystallization layer 6; a hole blocking layer 7; a thin fluoride layer 8; and a bias electrode 9 that transmits a recording electromagnetic wave carrying image information, which are formed in layers in this order on a substrate 1.

The active matrix layer 2 includes a number of charge detecting elements which are two-dimensionally arrayed in directions perpendicular to each other. Each charge detecting element includes a charge storage section that stores an electric charge generated at the recording photoconductive layer 5 and a switching element that reads out an electric charge signal of the electric charge stored in the charge storage section. FIG. 3 is an enlarged sectional view of the active matrix layer 2. As shown in FIG. 3, a TFT 31 and a storage capacitor 32 are formed correspondingly to each pixel in the active matrix layer 2. An output line of each TFT 31 is connected to a signal detecting means (not shown). A control line of each TFT 31 is connected to a TFT controlling means (not shown). The storage capacitor 32 is formed by a lower electrode 33, an insulating layer 34, an upper electrode 35 and a charge collection electrode 36, which are formed in layers in this order on the substrate 1. A region of the upper electrode 35 of the storage capacitor 32 facing the lower electrode 33 (via the insulating layer 34) is a region where an electric charge is induced (stored), and is equivalent to the charge storage section. The lower electrode 33 is an electrode serving as a reference potential for the bias electrode 9, and is equivalent to a reference electrode.

In the radiographic image detector 10, when an X-ray is applied to the recording photoconductive layer 5 when an electric field is formed between the bias electrode 9 and the reference electrode, charge pairs are generated in the recording photoconductive layer 5, and latent image electric charges corresponding to amounts of the charge pairs are stored in the charge storage sections in the active matrix layer 2. In order to read the stored latent image electric charges, the TFTs of the active matrix layer 2 are sequentially driven so that an image signal based on the latent image electric charge corresponding to each pixel is outputted from the output line, and the image signal is detected by the signal detecting means to read an electrostatic latent image carried by the latent image electric charges.

Referring again to FIG. 1, the electrode located at the positive potential side with respect to the charge storage sections when the electric charges in the charge storage sections are read out is the bias electrode 9. When a voltage is applied to the bias electrode 9, holes are injected from the bias electrode 9 toward a-Se of the recording photoconductive layer. However, by providing the thin fluoride layer 8 between the bias electrode 9 and the recording photoconductive layer 5, the holes can be blocked. It should be noted that, although the anti-crystallization layer 6 and the hole blocking layer 7 are disposed between the bias electrode 9 and the recording photoconductive layer 5 in the aspect shown in FIG. 1, only one of the anti-crystallization layer 6 and the hole blocking layer 7 may be provided, or both of them may be omitted.

As the substrate 1, for example, glass, polyimide, polycarbonate, or a flexible substrate formed by a SUS metal plate having a thickness around 0.1 mm with a thin insulating film, such as $SiO_2$, formed thereon can be used.

The electron blocking layer 3 is a layer for blocking or trapping, in the layer or at the layer interface, electrons being injected from the pixel electrodes toward the recording photoconductive layer 5. For the electron blocking layer 3, an inorganic material such as $Sb_2S_3$, $As_2Se_3$, $As_2S_3$ or CdSe, or an organic film, such as PVK or polycarbonate (PC) with hole transporting molecules added thereto can be used. The electron blocking layer may have a layer thickness around 0.05-5 µm.

The anti-crystallization layers 4 and 6 may be a-Se layers which contain at least one element selected from the group consisting of As, Sb and Bi in an mount of 3-40%, or optionally 10-33%, and have a thickness of 0.05-0.3 µm. Alternatively, an organic film such as polycarbonate film can be used as the anti-crystallization layers 4 and 6. By providing the anti-crystallization layers 4 and 6, crystallization of the recording photoconductive layer 5 at the interfaces between the recording photoconductive layer 5 and the anti-crystallization layers 4 and 6 can be hindered.

The recording photoconductive layer 5 consists primarily of a-Se, and may be doped with an alkali metal. The expression "consist primarily of" herein means that the a-Se content is 50% or more.

The hole blocking layer 7 is a layer that blocks holes and transmits electrons, and is formed by a film of, for example, $Sb_2S_3$, CdS or $CeO_2$, or by an organic polymer layer. The organic polymer layer may, for example, be a film of an insulating polymer, such as polycarbonate, polystyrene, polyimide or polycycloolefin, with carbon cluster, such as C60 (fullerene) or C70, mixed thereto. The hole blocking layer 7 may be formed by a film of $Sb_2S_3$, for example, and an organic polymer layer which are formed one on the other. In this case, the organic polymer layer may be located nearer to the recording conductive layer 5.

The thin fluoride layer 8 is a layer that consists only of a fluoride. Examples of the fluoride include alkali metal fluorides and alkali earth metal fluorides, and specifically include LiF, NaF, KF, CsF, RbF, $MgF_2$ and $CaF_2$. The thin fluoride layer 8 can be provided by resistive heating vapor deposition, electron beam vapor deposition, or any of other methods.

The thin fluoride layer may have a layer thickness of 1-5 nm, or optionally 1-3 nm. If the thin fluoride layer has a layer thickness less than 1 nm, the thin fluoride layer cannot provide a sufficient hole blocking function. On the other hand, if the thin fluoride layer has a layer thickness more than 5 nm, thermal influence during a production process of the thin fluoride layer is increased, and the lower layer may be thermally damaged. The layer thickness of the thin fluoride layer can directly be measured from a cross sectional TEM image of the produced radiographic image detector.

The bias electrode 9 may be made of any electrode material that transmits X-ray, and an example thereof is a thin gold film.

The electron blocking layer, the anti-crystallization layer, the recording photoconductive layer and the bias electrode can respectively be provided using any of known methods, such as resistive heating vapor deposition, electron beam vapor deposition or sputtering.

FIG. 2 is a schematic sectional view illustrating one embodiment of the radiographic image detector according to a second aspect of the invention. It should be noted that components shown in FIG. 2 that are the same as those shown in FIG. 1 are designated by the same reference numerals, and descriptions thereof are omitted unless necessity arises (the same applies to descriptions of the following embodiments).

The radiographic image detector 10 shown in FIG. 2 includes: the active matrix layer 2 including reading circuits formed by TFTs and pixel electrodes; the thin fluoride layer 8; the hole blocking layer 7; the anti-crystallization layer 6; the recording photoconductive layer 5; the anti-crystallization layer 4; the electron blocking layer 3; and the bias electrode 9 that transmits a recording electromagnetic wave carrying image information, which are formed in layers in this order on the substrate 1.

In the radiographic image detector shown in FIG. 2, the electrode located at the positive potential side with respect to the charge storage sections when the electric charges in the charge storage sections are read out is the active matrix layer 2 (specifically, the reference electrodes in the active matrix layer) including the reading circuits formed by TFTs and the storage capacitors. When a voltage is applied, holes are injected from the reference electrodes toward the a-Se of the recording photoconductive layer 5. However, by providing the thin fluoride layer 8 between the reference electrodes and the recording photoconductive layer 5, the holes can be blocked. It should be noted that, although the anti-crystallization layer 6 and the hole blocking layer 7 are disposed between the active matrix layer 2 and the recording photoconductive layer 5 in the aspect shown in FIG. 2, only one of the anti-crystallization layer 6 and the hole blocking layer 7 may be provided, or both of them may be omitted.

FIG. 4 is a schematic sectional view illustrating one embodiment of the radiographic image detector according to a third aspect of the invention, and illustrates the configuration of a so-called optical reading-type radiographic image detector, in which the electric charges stored in the charge storage regions are read using a semiconductor material that generate an electric charge when exposed to light. The radiographic image detector 10 shown in FIG. 4 includes: a second electrode 11; a reading photoconductive layer 12; a charge storage section 13; the recording photoconductive layer 5; the anti-crystallization layer 6; the hole blocking layer 7; the thin fluoride layer 8; and a first electrode 9 that transmits a recording electromagnetic wave carrying image information, which are formed in layers in this order on the substrate 1. In this radiographic image detector, a reading linear light source is moved to scan perpendicularly to the second electrode 11 to read out the radiographic image.

In the radiographic image detector shown in FIG. 4, the electrode located at the positive potential side with respect to the charge storage section 13 when the electric charges in the charge storage section 13 are read out is the first electrode 9. When an voltage is applied to the first electrode 9, holes are injected from the first electrode 9 toward the a-Se of the recording photoconductive layer 5. However, by providing the thin fluoride layer 8 between the first electrode 9 and the recording photoconductive layer 5, the holes can be blocked.

The second electrode 11 has a linear electrode structure in which electrodes for taking out the signals are alternately arranged in stripes. Below the electrodes of the second electrode 11, a color filter layer, which transmits only light having a particular wavelength, is formed via a transparent organic insulating layer. In the second electrode 11 having the linear electrode structure, a layer above the color filter layer forms a common line, and a layer at areas where no color filter layer is formed forms a signal line. The common line is commonized outside a radiation detection section. The second electrode 11 needs to be transparent since the light is applied through the back surface, and also needs to be flat to avoid damage due to concentration of the electric field when a high voltage is applied. The second electrode 11 may be formed, for example, of IZO or ITO.

The reading photoconductive layer 12 is formed of a photoconductive material that absorbs an electromagnetic wave, in particular visible light, and generates an electric charge. Examples of the material forming the reading photoconductive layer 12 include semiconductor materials having an energy gap within the range from 0.7 to 2.5 eV, such as amorphous selenium compounds, amorphous Si:H, crystalline Si or GaAs, and in particular, amorphous selenium. If an amorphous selenium compound is used to form the reading photoconductive layer 12, the layer may be doped with an alkali metal, such as Li, Na, K, Cs or Rb, in a slight amount within the range from 0.001 ppm to 1 ppm, may be doped with a fluoride, such as LiF, NaF, KF, CsF or RbF, in a slight amount within the range from 10 ppm to 10000 ppm, may be added with P, As, Sb or Ge in an amount within the range from 50 ppm to 0.5%, may be doped with As in an amount within the range from 10 ppm to 0.5%, or may be doped with Cl, Br or I in a slight amount within the range from 1 ppm to 100 ppm.

The charge storage section 13 may be formed by any film that insulates electric charges of a polarity intended to be stored, and examples thereof include polymers such as acrylic organic resins, polyimide, BCB, PVA, acryl, polyethylene, polycarbonate, polyetherimide, sulfides such as $As_2S_3$, $Sb_2S_3$ and ZnS, oxides and fluorides. Optionally, the material for forming the charge storage section 13 may insulate electric charges of a polarity intended to be stored and conduct electric charges of the opposite polarity, and may further optionally have a value of mobility×life that varies by a triple-digit difference or more depending on the polarity of the electric charges.

The first electrode 9 may be formed by a thin metal film, and examples thereof include metals such as Au, Ni, Cr, Au, Pt, Ti, Al, Cu, Pd, Ag, Mg, a 3-20% MgAg alloy, a Mg—Ag intermetallic compound, a 3-20% MgCu alloy and a Mg—Cu intermetallic compound. In particular, Au, Pt or a Mg—Ag intermetallic compound may be used.

FIG. 5 is a schematic sectional view illustrating one embodiment of the radiographic image detector according to a fourth aspect of the invention, and illustrates the configuration of another radiographic image detector of the optical reading type. The radiographic image detector 10 shown in FIG. 5 includes: a linear electrode 11 (equivalent to the second electrode, the reference electrode, and hereinafter referred to as the reference electrode); the thin fluoride layer 8; the reading photoconductive layer 12; the charge storage section 13; the recording photoconductive layer 5; the anti-crystallization layer 6; the hole blocking layer 7; and the first electrode 9 that transmits a recording electromagnetic wave carrying image information, which are formed in layers in this order on the substrate 1.

In the radiographic image detector shown in FIG. 5, the electrode located at the positive potential side with respect to the charge storage section 13 when the electric charges in the charge storage section 13 are read out is the linear electrode 11. When a voltage is applied to the linear electrode 11, holes are injected from the linear electrode 11 toward the a-Se of the recording photoconductive layer 5. However, by providing the thin fluoride layer 8 between the linear electrode 11 and the recording photoconductive layer 5, the holes can be blocked.

Hereinafter, the radiographic image detector of the invention is described in further detail by means of Examples.

EXAMPLES

Examples 1-5, Comparative Example 1

An electron blocking layer formed of antimony sulfide ($Sb_2S_3$) having a layer thickness of 2 μm was formed on a substrate with switching TFTs and storage capacitors arrayed thereon. Then, a film of a Se material containing 3% of As was formed through vapor deposition to provide an anti-crystallization layer having a layer thickness of 0.15 μm. Subsequently, a film of a Se material containing 10 ppm of Na was formed through vapor deposition to provide a recording photoconductive layer formed of amorphous Se having a layer thickness of 200 μm.

Then, a hole blocking layer formed of antimony sulfide ($Sb_2S_3$) having a layer thickness of 0.3 μm was provided. Subsequently, a LiF material was put in an $Al_2O_3$ crucible, and the crucible was heated with a tungsten filament. After a predetermined time of vapor deposition, vapor from the LiF boat was cut with a cell shutter. In this manner, thin LiF layers of Examples 1-5 having different layer thicknesses were respectively formed. (The different layer thicknesses of the thin LiF layers were obtained by adjusting the time of vapor deposition with monitoring the film thickness with a film thickness monitor including a crystal oscillator. It should be noted that the thin LiF layer was not provided in Comparative Example 1.)

Subsequently, a film of Au was formed on the thin LiF layer through vapor deposition to provide a bias electrode having a layer thickness of 0.1 μm. Finally, a voltage application cable was connected on the bias electrode, and a peripheral driving circuit was mounted to the TFT-array X-ray charge converting film substrate to complete the radiographic image detector.

It should be noted that the same films of the same configuration as those described above were formed on a 5 cm-square glass substrate provided with an amorphous IZO layer in the simultaneous process to provide a reference detector for measuring the following dark current and X-ray sensitivity.

(Measurement of Image Defect Before and after Accelerated Test)

TFT pixel size: 150 μm

Accelerated test: 40° C., three months (experiments were carried out under the accelerated test temperature of 40° C. with varied accelerated test times, and differences in increase of image defects became distinguishable after three months of the accelerated test. Therefore, these conditions were used for evaluation.)

Application of electric field: measurement was carried out after 60 seconds from application of +2 kV to the bias electrode.

Using the above-prepared radiographic image detectors, relative changes in the number of image defects before and after the accelerated test under the above-described conditions were calculated. The numbers of image defects in an image before and after the accelerated test were calculated in the following manner: first a voltage of +2 kV was applied to the bias electrode, an offset image after 60 seconds from the application of the voltage was obtained, and the total number of abnormal pixels, which were pixels regarded as defective pixels having abnormal densities that exceed five times a density fluctuation variance of the offset image, was calculated as the number of defective pixels. The numbers of defective pixels after the accelerated test are shown in Table 1 as relative values to the value of comparative example 1.

(Measurement of X-Ray Sensitivity and Dark Current)

A voltage of +2 kV was applied to the upper electrode of the reference detector and an ammeter was connected to the IZO layer to read out a dark current and X-ray sensitivity. The dark current was a current value measured after 60 seconds from the application of the bias voltage. The X-ray sensitivity was obtained in the following manner: a bias electric field was applied for 600 seconds, then an X-ray (710 msec) with a tube voltage of 28 kV (Mo tube) and a tube current of 80 ma was applied ten times with intervals of 15 seconds through an Mo filter of 30 μm and an Al filter of 2 mm, and a current value after 60 second from the application of the X-ray was measured. Values of the dark current and the X-ray sensitivity of the respective samples after the repeated X-ray application are shown in Table 1 as relative values to the values of comparative example 1.

(Measurement of Layer Thickness of Thin LiF Layer)

Layer thicknesses of the thin LiF layers of the respective Examples were directly measured from cross sectional TEM images of the prepared radiographic image detectors.

TABLE 1

|  | Thickness of LiF layer (nm) | Number of image defects after accelerated test (relative value) | Dark current (relative value) | X-ray sensitivity (relative value) |
| --- | --- | --- | --- | --- |
| Comparative Example 1 | — | 1 (reference) | 100 (reference) | 1.0 (reference) |
| Example 1 | 0.1 | 1 | 95 | 1.0 |
| Example 2 | 0.3 | 1 | 70 | 1.0 |
| Example 3 | 1 | 1 | 2 | 1.0 |
| Example 4 | 3 | 1 | 1 | 1.0 |
| Example 5 | 10 | 5 | 5 | 0.9 |

As can be seen from Table 1, the radiographic image detectors of Examples 1-5 each provided with the LiF layer having a thickness ranging from 0.1 to 10 nm exhibited less increase of the dark current after the repeated application of X-ray than that of Comparative Example 1. In particular, the radiographic image detectors of Examples 3-5 provided with the thin LiF layer having the thickness of 1 nm or more exhibited the dark current values after the repeated application of X-ray that are significantly lower than those of Examples 1 and 2 provided with the thin LiF layer having the thickness ranging from 0.1 to 0.3 nm. Further, the radiographic image detectors of Examples 1-4 provided with the thin LiF layer having the layer thickness of 5 nm or less exhibited less decrease of the number of image defects and the X-ray sensitivity after the accelerated test than those of the radiographic image detector of Example 5 provided with the thin LiF layer having the layer thickness of 10 nm. The reason of this is probably that a large thermal influence is exerted in the process of providing the thin LiF layer having the layer thickness as large as 10 nm, and this results in considerably large thermal damage to the hole blocking layer below the thin LiF layer.

As can be seen from above, the radiographic image detectors shown in the Examples provided with the thin LiF layer between the bias electrode and the recording photoconductive layer can prevent increase of the dark current after repeated use, increase of image defects over time, and decrease of X-ray sensitivity. Further, during the production process, the Se chamber is not contaminated with LiF, which is the case in co-deposition for doping LiF to a-Se, thereby improving production stability. It should be noted that, although the thin LiF layer was formed on the hole blocking layer ($Sb_2S_3$) in the Examples, the hole blocking layer may not be provided and the thin LiF layer may be formed directly on the recording photoconductive layer.

It should be noted that, although the Examples show the aspect of the TFT radiographic image detector provided with the thin LiF layer formed between the bias electrode and the recording photoconductive layer, the similar tendency is expected for the aspect of the radiographic image detector as shown in FIG. 2, in which the thin LiF layer is provided between the reference electrode and the recording photoconductive layer, and for the optical reading-type radiographic image detector as shown in FIG. 3 or 4.

Further, although the Examples show only the cases of the thin layer formed of LiF, other alkali metal fluorides or alkali earth metal fluorides can similarly be used. These fluorides have similar chemical properties in that they have ion binding property and wide band gap, and form a localized level for trapping holes when they are present in a-Se. Therefore, they are expected to provide the similar effects.

In the aspect of the radiographic image detector of the invention that includes: a bias electrode that transmits a recording electromagnetic wave carrying image information; a recording photoconductive layer consisting primarily of a-Se that generates electric charges when exposed to the recording electromagnetic wave transmitted through the bias electrode; and a number of charge detecting elements two-dimensionally arrayed in directions perpendicular to each other, each charge detecting element including a charge storage section for storing the electric charge generated at the recording photoconductive layer and a switching element for reading out an electric charge signal of the electric charge stored in the charge storage section, a thin fluoride layer consisting only of a fluoride is provided between the bias electrode and the recording photoconductive layer or between the electric charge detecting elements and the recording photoconductive layer. In the aspect of the radiographic image detector of the invention that includes, in the following order: a first electrode that transmits a recording radiation ray; a recording photoconductive layer consisting primarily of a-Se that exhibits photoconductivity when exposed to the recording radiation ray; a charge storage section for storing electric charges, which has a polarity of a latent image, generated at the first electrode; a reading photoconductive layer that exhibits photoconductivity when exposed to a reading electromagnetic wave; and a second electrode that transmits the reading electromagnetic wave, a thin fluoride layer consisting only of a fluoride is provided between the first electrode and the recording photoconductive layer, or between the second electrode and the reading photoconductive layer. Therefore, unlike the case where a layer of a-Se doped with a compound dopant is provided, the compound dopant does not directly contact a-Se during the production process, and therefore crystallization of a-Se over time is highly unlikely. Therefore, image defects are not likely to increase over time.

Further, good sensitivity can be maintained over a long period of time while minimizing accumulation of electric charges in the thin fluoride layer and minimizing dark current after repeated use. In addition, unlike the case where a hole trapping layer formed of a-Se doped with a compound dopant is provided, it is not necessary to place the Se boat and the boat for the dopant in the same vacuum chamber during the production process. Therefore, a period of maintenance work can be increased, thereby reducing production costs.

What is claimed is:

1. A radiographic image detector comprising:
    a bias electrode transmitting a recording electromagnetic wave carrying image information;
    a recording photoconductive layer consisting primarily of a-Se, the recording photoconductive layer generating electric charges when exposed to the recording electromagnetic wave transmitted through the bias electrode; and
    a number of charge detecting elements two-dimensionally arrayed in directions perpendicular to each other, each charge detecting element comprising a charge storage section for storing the electric charge generated at the recording photoconductive layer and a switching element for reading out an electric charge signal of the electric charge stored in the charge storage section, wherein the radiographic image detector further comprises a thin fluoride layer, which is selected from a group consisting of alkali metal fluorides and alkali earth metal fluorides, provided between the bias electrode and the recording photoconductive layer.

2. The radiographic image detector as claimed in claim 1, wherein the thin fluoride layer has a layer thickness ranging from 1 to 5 nm.

3. A radiographic image detector comprising:
a bias electrode transmitting a recording electromagnetic wave carrying image information;
a recording photoconductive layer consisting primarily of a-Se, the recording photoconductive layer generating electric charges when exposed to the recording electromagnetic wave transmitted through the bias electrode; and
a number of charge detecting elements two-dimensionally arrayed in directions perpendicular to each other, each charge detecting element comprising a charge storage section for storing the electric charge generated at the recording photoconductive layer and a switching element for reading out an electric charge signal of the electric charge stored in the charge storage section,
wherein the radiographic image detector further comprises a thin fluoride layer, which is selected from a group consisting of alkali metal fluorides and alkali earth metal fluorides, provided between the electric charge detecting elements and the recording photoconductive layer.

4. The radiographic image detector as claimed in claim 3, wherein the thin fluoride layer has a layer thickness ranging from 1 to 5 nm.

5. A radiographic image detector comprising, in the following order:
a first electrode transmitting a recording radiation ray;
a recording photoconductive layer consisting primarily of a-Se, the recording photoconductive layer exhibiting photoconductivity when exposed to the recording radiation ray;
a charge storage section for storing electric charges generated at the first electrode, the electric charges having a polarity of a latent image;
a reading photoconductive layer exhibiting photoconductivity when exposed to a reading electromagnetic wave; and
a second electrode transmitting the reading electromagnetic wave,
wherein the radiographic image detector further comprises a thin fluoride layer, which is selected from a group consisting of alkali metal fluorides and alkali earth metal fluorides, provided between the first electrode and the recording photoconductive layer.

6. The radiographic image detector as claimed in claim 5, wherein the thin fluoride layer has a layer thickness ranging from 1 to 5 nm.

7. A radiographic image detector comprising, in the following order:
a first electrode transmitting a recording radiation ray;
a recording photoconductive layer consisting primarily of a-Se, the recording photoconductive layer exhibiting photoconductivity when exposed to the recording radiation ray;
a charge storage section for storing electric charges generated at the first electrode, the electric charges having a polarity of a latent image;
a reading photoconductive layer exhibiting photoconductivity when exposed to a reading electromagnetic wave; and
a second electrode transmitting the reading electromagnetic wave,
wherein the radiographic image detector further comprises a thin fluoride layer, which is selected from a group consisting of alkali metal fluorides and alkali earth metal fluorides, provided between the second electrode and the reading photoconductive layer.

8. The radiographic image detector as claimed in claim 7, wherein the thin fluoride layer has a layer thickness ranging from 1 to 5 nm.

* * * * *